United States Patent
Xie et al.

(10) Patent No.: US 8,516,306 B2
(45) Date of Patent: Aug. 20, 2013

(54) COMPUTER STARTUP TEST APPARATUS

(75) Inventors: Ling-Yu Xie, Shenzhen (CN); Xing-Ping Xie, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 338 days.

(21) Appl. No.: 12/961,326

(22) Filed: Dec. 6, 2010

(65) Prior Publication Data
US 2012/0047400 A1 Feb. 23, 2012

(30) Foreign Application Priority Data
Aug. 23, 2010 (CN) .......................... 2010 1 0260095

(51) Int. Cl.
*G06F 11/00* (2006.01)
(52) U.S. Cl.
USPC .......................................................... 714/36
(58) Field of Classification Search
USPC ................. 714/23–25, 27, 30, 31, 36, 37, 39, 714/47.1, 721, 722, 724, 737
See application file for complete search history.

(56) References Cited

U.S. PATENT DOCUMENTS

| | | | |
|---|---|---|---|
| 6,880,110 B2* | 4/2005 | Largman et al. | 714/38.13 |
| 7,529,952 B2* | 5/2009 | Lu | 713/300 |
| 2002/0052706 A1* | 5/2002 | Odaohhara et al. | 702/119 |
| 2002/0188887 A1* | 12/2002 | Largman et al. | 714/13 |
| 2008/0209271 A1* | 8/2008 | Liu et al. | 714/36 |

* cited by examiner

*Primary Examiner* — Nadeem Iqbal
(74) *Attorney, Agent, or Firm* — Altis Law Group, Inc.

(57) ABSTRACT

A computer startup test apparatus for turning on a computer automatically, includes a control module, a switch module, and a startup module. The control module is configured to output control signals, data signals and clock signals. The switch module is configured to receive the control signals, and turn on the computer according to the received control signals. The startup module is configured to receive the data signals and clock signals, and restarts the computer according to the received data signals and clock signals. The control module stores a predetermined test time. The control module records abnormal information and test times when the computer restarts, and outputs the control signals to turn on the computer using the switch module when the computer cannot restart.

12 Claims, 2 Drawing Sheets

COMPUTER STARTUP TEST APPARATUS

BACKGROUND

1. Technical Field

The disclosure generally relates to computer startup test apparatus, especially to a computer startup test apparatus used to turn on a computer automatically.

2. Description of Related Art

To test reliability of electronic apparatuses, such as computers, to power up reliably, they are turned on and off repeatedly. However, the testing requires an engineer to operate a power button on the computer repeatedly to turn the computer on and off, which is inefficient and expensive.

Therefore there is a need for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
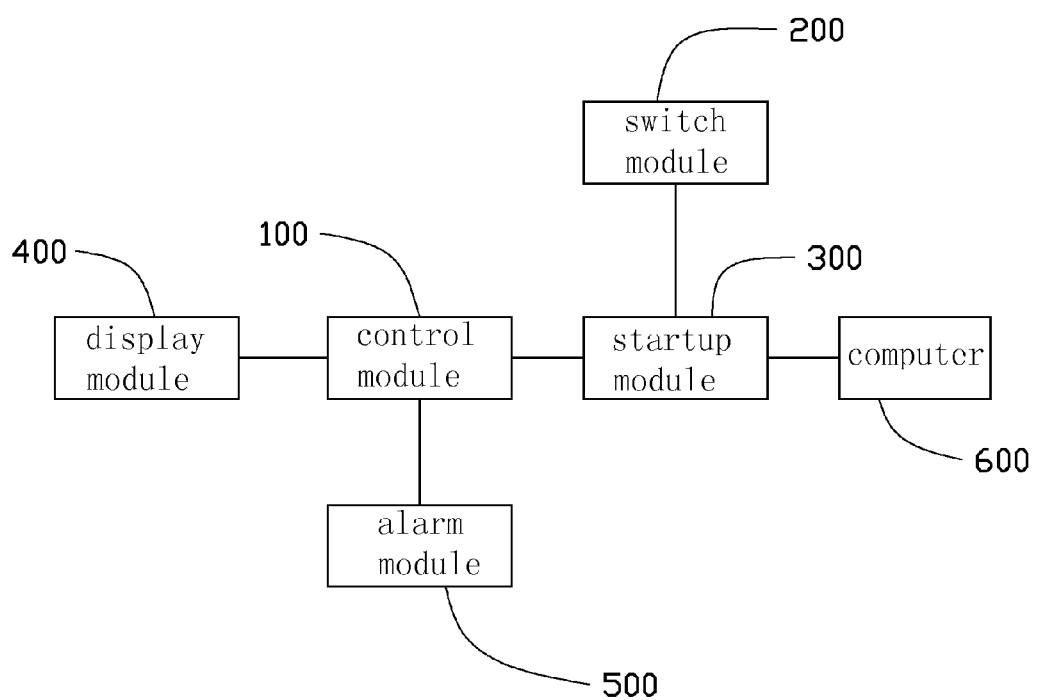
FIG. 1 is a block diagram of an embodiment of a computer startup test apparatus.

Referring to FIG. 1, an embodiment of a computer startup test apparatus for testing a computer 600 includes a control module 100, a switch module 200, a startup module 300, a display module 400, and an alarm module 500. The control module 100 is configured to output control signals, data signals, and clock signals. The switch module 200 is configured to receive the control signals and turn on the computer 600 according to the received control signals. The startup module 300 is configured to receive the data signals and clock signals and restart (turn off then back on) the computer 600 according to the received data signals and clock signals. The control module 100 stores a predetermined test time. The control module 100 is configured to record abnormal information and test times when the computer 600 restarts, and turns on the computer 600 using the switch module 200 when the computer 600 does not restart in response to the startup module 300. The display module 400 is configured to receive and display the abnormal information and test times. The alarm module 500 is configured to activate an audio and/or visual alarm when the computer 600 cannot restart.

Figure 2:
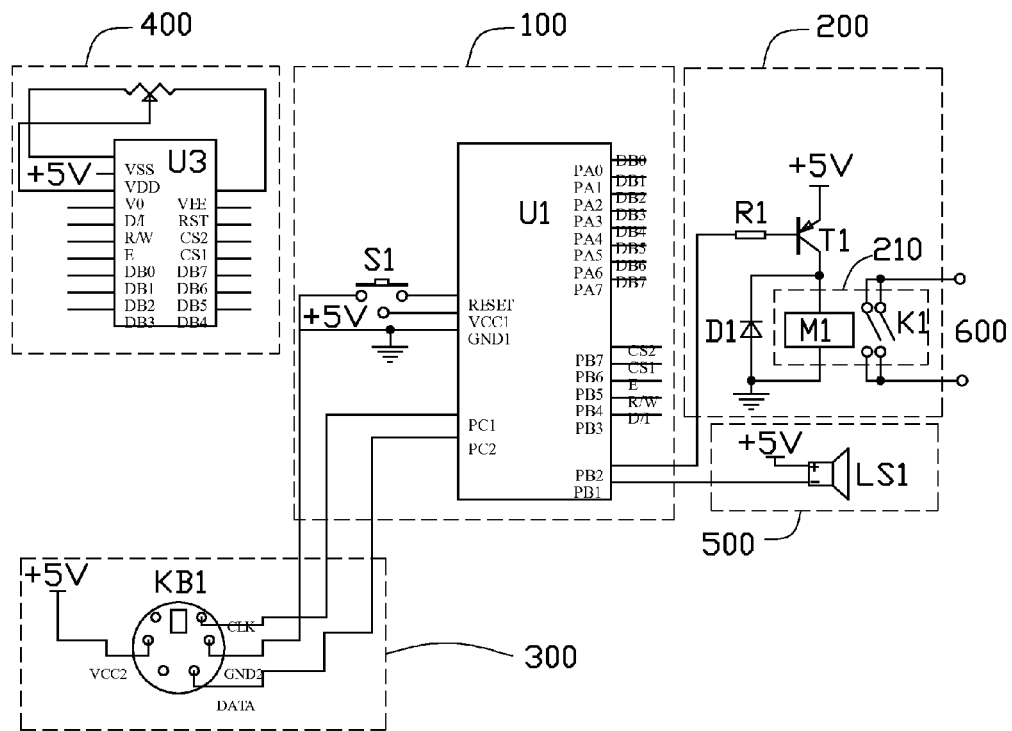
FIG. 2 is a circuit view of an embodiment of the computer startup test apparatus of FIG. 1.

Referring to FIG. 2, the control module 100 includes a micro controller U1 and a reset switch S1. The micro controller U1 includes a number of serial signal output terminals PA0~PA7, an alarm signal output terminal PB1, a control signal output terminal PB2, a clock signal output terminal PC1, a data signal output terminal PC2, a reset signal output terminal RESET, a first ground terminal GND1 and a first power terminal VCC1. The control module 100 is configured to convert the abnormal information and test times to serial data signals which are output by the number of serial signal output terminals PA0~PA7. When the computer 600 cannot restart, the control module 100 outputs an alarm signal using the alarm signal output terminal PB1. The control signal output terminal PB2, the clock signal output terminal PC1, and the data signal output terminal PC2 are configured to output control signals, clock signals, and data signals respectively. The reset signal output terminal RESET is electrically connected to the first ground terminal GND1 by the reset switch S1. The first power terminal VCC1 is configured to receive a +5V first voltage from the computer 600. In one embodiment, the micro controller U1 is an ATmega16 type single chip produced by ATMEL Corporation of America. The micro controller U1 is reset by closing the reset switch S1 manually.

The switch module 200 includes a transistor T1, a relay 210, a diode D1 and a resistor R1. The relay 210 includes a coil unit M1 and a switch unit K1. A transistor base is electrically connected to the control signal output terminal PB2 by the resistor R1. A transistor emitter is configured to receive the +5V first voltage. A transistor collector is grounded via the coil unit M1. The switch unit K1 is electrically connected to a power button of the computer 600. A diode cathode is electrically connected to the transistor collector. A diode anode is grounded. In one embodiment, the transistor T1 is a pnp type transistor.

The startup module 300 includes a PS/2 interface circuit KB1. The PS/2 interface circuit includes a clock signal input terminal CLK, a data signal input terminal DATA, a second ground terminal GND2 and a second power terminal VCC2. The clock signal input terminal CLK and the data signal input terminal DATA are electrically connected to the clock signal output terminal PC1 and the data signal output terminal PC2 respectively. The second ground terminal GND2 is electrically connected to the first ground terminal GND1. The second power terminal VCC2 is configured to receive the +5V first voltage.

The display module 400 includes a display chip U2. The display chip U2 includes a number of serial signal input terminals DB0~DB7 and a third power terminal VDD. The number of serial signal input terminals DB0~DB7 are electrically connected to the number of serial signal output terminals PA0~PA7 respectively. The number of serial signal input terminals DB0~DB7 are configured to receive the abnormal information and test times from the control module 100. The third power terminal VDD is configured to receive the +5V first voltage. In one embodiment, the display module 400 is a GXM12864 type LCD produced by GUO XIAN Electronic company of China.

In some embodiments, the alarm module 500 includes a buzzer LS1. A buzzer anode is configured to receive the +5V first voltage. A buzzer cathode is electrically connected to the alarm signal output terminal PB1.

In use, the micro controller U1 outputs a low voltage level control signal to the switch module 200 by the control signal output terminal PB2. The transistor T1 turns on and the coil unit M1 of the relay 210 is powered up. The switch unit K1 of the relay 210 is closed by the coil unit M1. The power button of the computer 600 is closed and the computer 600 turns on to output the +5V first voltage. When an operating system of the computer 600 becomes active, the micro controller U1 outputs clock signals and data signals using the clock signal output terminal PC1 and the data signal output terminal PC2 respectively. The startup module 300 receives the clock signals and data signals from the clock signal input terminal CLK and the data signal input terminal DATA respectively to restart the computer 600. When a startup time of the computer 600 is equal to the predetermined test time, the micro controller U1 outputs a high voltage level control signal to the switch module 200 using the control signal output terminal PB2. The transistor T1 turns off and the coil unit M1 of the relay 210 is powered off. The switch unit K1 of the relay 210 is opened by the coil unit M1. The power button of the computer 600 is opened and the computer 600 turns off again.

During the startup process of the computer 600; if the computer 600 cannot start, the control module 100 records the abnormal information and test times, and converts the abnormal information and test times to serial data signals which are output by the number of serial signal output terminals PA0~PA7. The display module 400 receives the serial data signals and displays the abnormal information and test times. The micro controller U1 outputs a low voltage level alarm signal to the alarm module 500 using the alarm signal output terminal PB1. The cathode of the buzzer LS1 receives the low voltage level alarm signal and the buzzer LS1 turns on. When the computer 600 cannot restart, the micro controller U1 outputs a low voltage level control signal to the switch module 200 using the control signal output terminal PB2. The computer 600 turns on again. When the test is complete, the micro controller U1 outputs a low voltage level test complete signal to the alarm module 500 using the alarm signal output terminal PB1. The cathode of the buzzer LS1 receives the low voltage level test complete signal and the buzzer LS1 alarms.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer startup test apparatus for turning on a computer automatically, comprising:
   a control module configured to output control signals, data signals and clock signals;
   a switch module configured to receive the control signals and turn on the computer according to the received control signals; and
   a startup module configured to receive the data signals and clock signals and restart the computer according to the received data signals and clock signals;
   wherein the control module is configured to store a predetermined test time; the control module is configured to record abnormal information and test times when the computer restarts; and the control module is configured to output the control signals to turn on the computer using the switch module when the computer cannot restart; the control module comprises a micro controller and a reset switch; the micro controller comprises a control signal output terminal, a data signal output terminal and a clock signal output terminal configured to output the control signals, the data signals and the clock signals respectively; the micro controller further comprises a reset signal output terminal, a first ground terminal and a first power terminal; the reset signal output terminal is electrically connected to the first ground terminal by the reset switch; and the first power terminal is configured to receive a first voltage from the computer; the switch module comprises a transistor and a relay; the relay comprises a coil unit and a switch unit; a base of the transistor is electrically connected to the control signal output terminal; an emitter of the transistor receives the first voltage; a collector of the transistor is grounded by the coil unit; and the switch unit is electrically connected to a power button of the computer.

2. The computer startup test apparatus of claim 1, wherein the switch module further comprises a diode; a cathode of the diode is electrically connected to the collector of the transistor; and an anode of the diode is grounded.

3. The computer startup test apparatus of claim 1, wherein the transistor is a pnp type transistor.

4. The computer startup test apparatus of claim 1, wherein the startup module comprises a PS/2 interface circuit; the PS/2 interface circuit comprises a data signal input terminal, a clock signal input terminal, a second ground terminal and a second power terminal; the data signal input terminal and the clock signal input terminal are electrically connected to the data signal output terminal and the clock signal output terminal respectively; and the second ground terminal is electrically connected to the first ground terminal; the second power terminal is configured to receive the first voltage.

5. The computer startup test apparatus of claim 1, further comprising a display module is configured to receive and displaying the abnormal information and test times.

6. The computer startup test apparatus of claim 3, further comprising an alarming module is configured to alarm when the computer cannot restart.

7. A computer startup test apparatus for turning on a computer automatically, comprising:
   a control module configured to output control signals, data signals and clock signals;
   a switch module configured to receive the control signals and turn on the computer according to the received control signals; and
   a startup module configured to receive the data signals and clock signals and restart the computer according to the received data signals and clock signals;
   wherein the control module is configured to store a predetermined test time; the control module is configured to record abnormal information and test times when the computer restarts; and the control module is configured to output the control signals to turn on the computer using the switch module until a startup time of the computer is equal to the predetermined test time; the control module comprises a micro controller and a reset switch; the micro controller comprises a control signal output terminal, a data signal output terminal and a clock signal output terminal configured to output the control signals, the data signals and the clock signals respectively; the micro controller further comprises a reset signal output terminal, a first ground terminal and a first power terminal; the reset signal output terminal is electrically connected to the first ground terminal by the reset switch; and the first power terminal is configured to receive a first voltage from the computer; the switch module comprises a transistor and a relay; the relay comprises a coil unit and a switch unit; a base of the transistor is electrically connected to the control signal output terminal; an emitter of the transistor receives the first voltage; a collector of the transistor is grounded by the coil unit; and the switch unit is electrically connected to a power button of the computer.

8. The computer startup test apparatus of claim 7, wherein the switch module further comprises a diode; a cathode of the diode is electrically connected to the collector of the transistor; and an anode of the diode is grounded.

9. The computer startup test apparatus of claim 7, wherein the transistor is a pnp type transistor.

10. The computer startup test apparatus of claim 7, wherein the startup module comprises a PS/2 interface circuit; the PS/2 interface circuit comprises a data signal input terminal, a clock signal input terminal, a second ground terminal and a second power terminal; the data signal input terminal and the clock signal input terminal are electrically connected to the data signal output terminal and the clock signal output terminal respectively; and the second ground terminal is electrically connected to the first ground terminal; the second power terminal receives the first voltage.

11. The computer startup test apparatus of claim 7, further comprising a display module configured to receive and display the abnormal information and test times.

12. The computer startup test apparatus of claim 9, further comprising an alarming module configured to be activated when the computer cannot restart.

* * * * *